United States Patent [19]

Packer et al.

[11] 3,751,661
[45] Aug. 7, 1973

[54] ENGINE OIL INSPECTION SYSTEM USING X-RAY FLUORESCENCE

[75] Inventors: Louis L. Packer, Enfield; William A. Bruton, East Hartford; Bernard A. Woody, Rockville, all of Conn.

[73] Assignee: United Aircraft Corporation, East Hartford, Conn.

[22] Filed: June 10, 1970

[21] Appl. No.: 44,954

[52] U.S. Cl. .................. 250/272, 250/308, 250/370
[51] Int. Cl. ......................................... G01n 23/22
[58] Field of Search ..................... 250/43.5 R, 51.5, 250/84, 88, 106 S

[56] References Cited
UNITED STATES PATENTS

| 3,443,092 | 5/1969 | Carr-Brion | 250/51.5 |
| 3,433,954 | 3/1969 | Bowman | 250/51.5 |
| 3,469,095 | 9/1969 | Starnes | 250/51.5 |
| 3,354,308 | 11/1967 | Engel | 250/51.5 |
| 3,526,127 | 9/1970 | Sarkis | 250/43.5 R |
| 3,396,272 | 8/1968 | Olson | 250/106 S |

Primary Examiner—James W. Lawrence
Assistant Examiner—C. E. Church
Attorney—Donald F. Bradley

[57] ABSTRACT

The concentration of metal wear particles in the lubricating oil system of engines such as aircraft gas turbines is continuously monitored by using x-ray fluorescent techniques. A beta excited x-ray source such as promethium-147 is mounted in a novel annular apposition target arrangement, and supplies primary x-rays to circulating engine oil. Depending on the source and target composition, selected metals such as iron in the oil will emit secondary fluorescent radiation which is measured by a lithium-drifted silicon semiconductor detector. Concentrations of metals as low as 2 parts per million may be detected.

8 Claims, 13 Drawing Figures

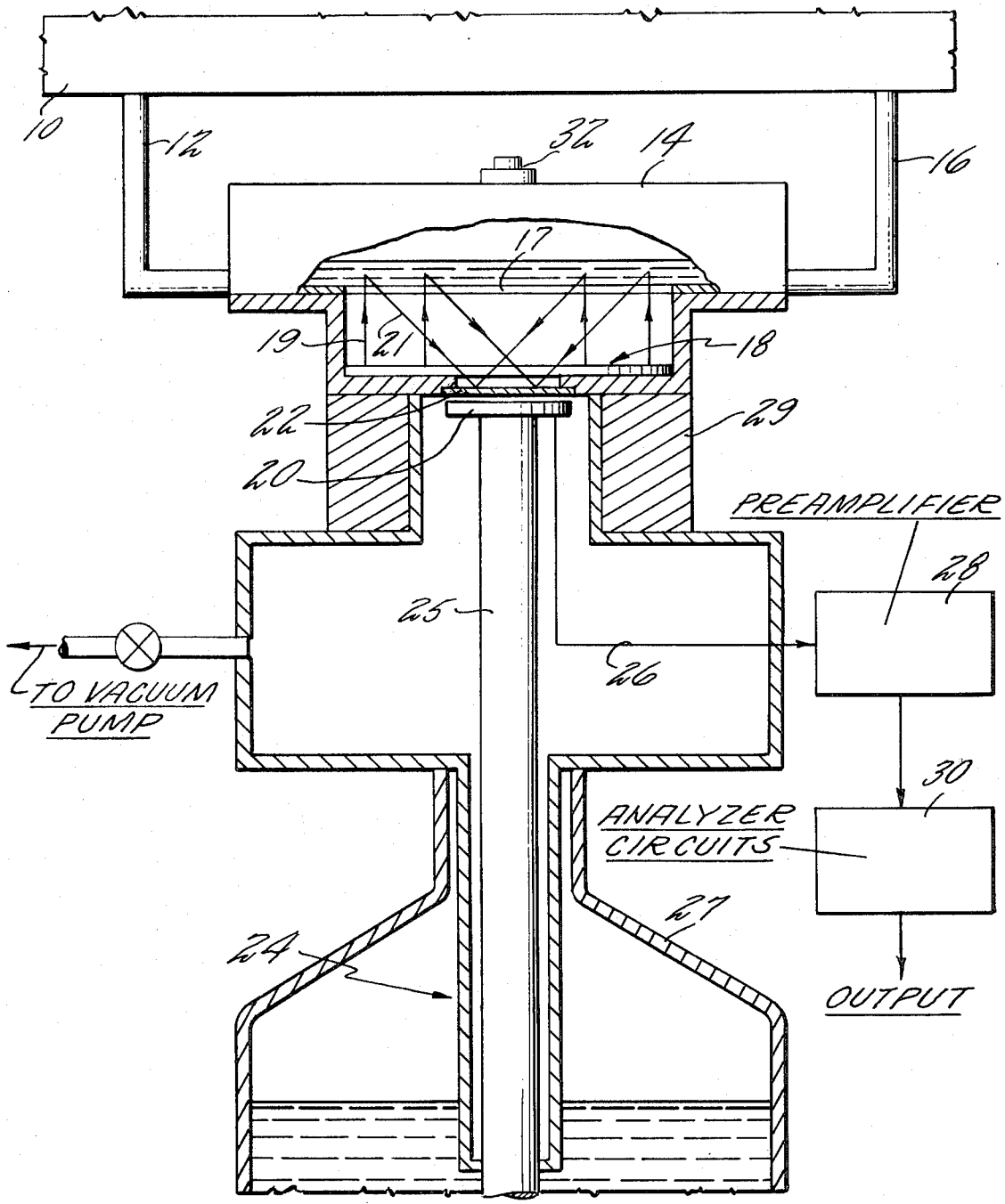

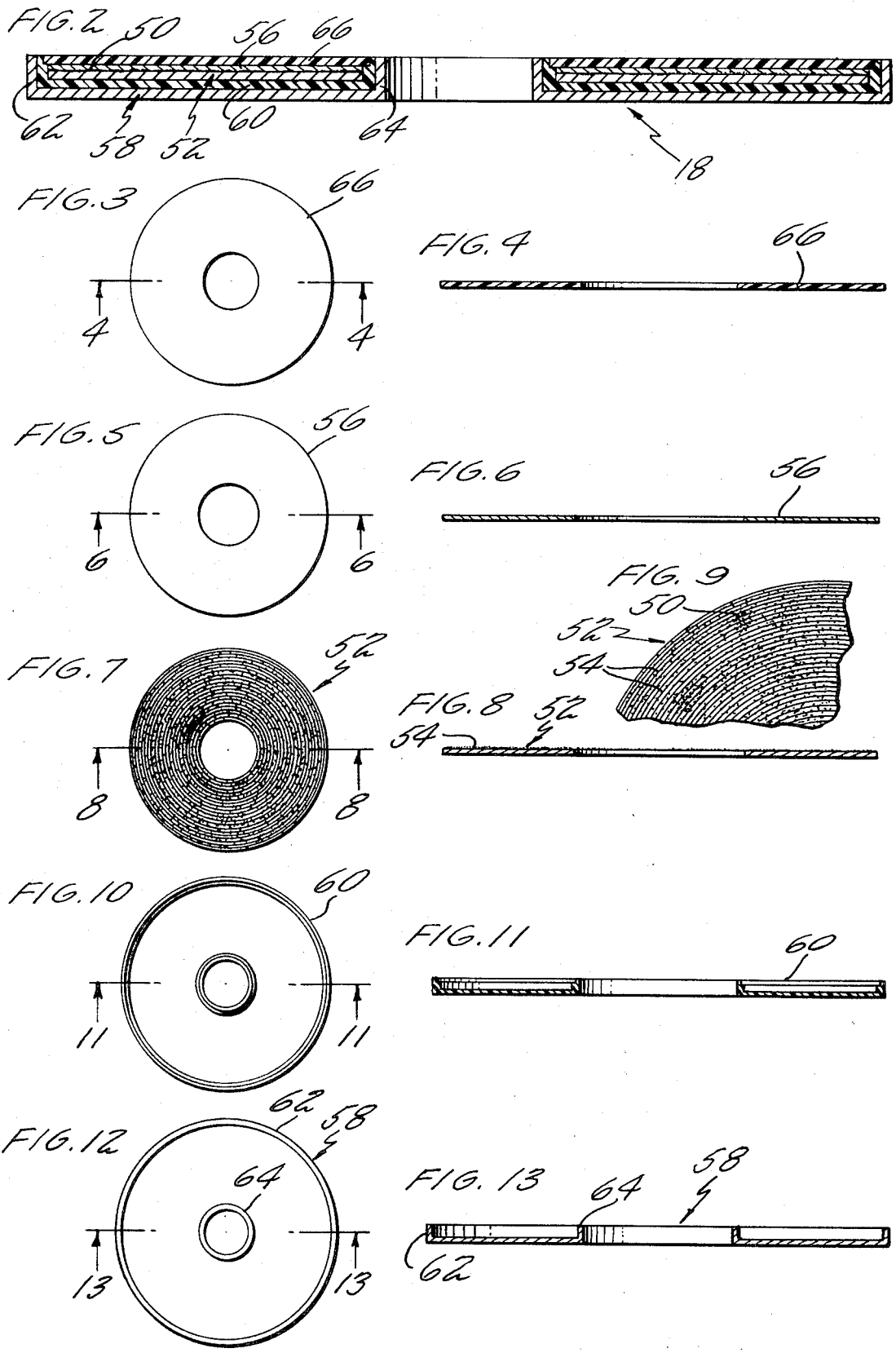

ENGINE OIL INSPECTION SYSTEM USING X-RAY FLUORESCENCE

BACKGROUND OF THE INVENTION

1. Field of the Invention

This invention relates to a system for continuously monitoring the condition of an engine by obtaining measurements of the metal content in the engine oil. More specifically, x-ray fluorescent analysis of the engine oil is performed by directing a beam of primary x-rays from a radioisotope x-ray source into a sample of the engine oil and de-tecting the characteristic secondary radiation emitted by a selected metal such as iron present in the oil sample.

2. Description of the Prior Art

Engine wear metal trend analysis, obtained by laboratory analysis of oil samples, is performed routinely on military aircraft and by certain commercial operations. This trend analysis, for a particular model trubine engine, when correlated to wear measurement or failure analysis obtained during engine overhaul, can serve as an indicator of possible incipient failure.

Prior art systems of engine wear metal trend analysis usually involve optical emission or atomic absorption spectroscopic analysis which requires the burning of small quantities of the oil sample. Each element present in the oil sample either emits or absorbs light of its characteristic wavelength. Measurement of the light intensity at each wavelength provides a means for determining the amount of each element within the oil sample. Analyses in the trace range in parts per million for most wear metals present in the oil samples can be obtained. However, these prior art methods require the removal of oil samples from the aircraft engine, and performance of the complicated analysis at a later time and place. In other words, on-stream trace analysis cannot be performed with these methods.

Conventional x-ray fluorescent spectrography has also been proposed to provide the required analysis. In this system, an x-ray tube is used as a high intensity source of primary x-radiation. The generated x-ray beam strikes the surface of the specimen to be analyzed, causing excitation of its characteristic radiation. These characteristic secondary x-radiations are scattered from a crystal surface, and, by suitable collimation and selection of the Bragg angle of reflection (dispersive analysis), the radiation is separated into its component wave-lengths. The number of photons scattered at each Bragg angle in a given period is proportional to the amount of each particular element present in the specimen. Intensity monitors are generally either Geiger or proportional detectors.

Up to the present time, in the monitoring of wear metals in oil, optical emission or absorption spectrometric analysis has been preferred. This is probably due to the higher cost, additional complexity and x-ray hazards of prior art x-ray fluorescent devices.

The present invention overcomes the disadvantages of the prior x-ray fluorescent devices by replacing the x-ray tube with a radioactive source and providing a system which is less expensive and which has an emission intensity which is much less than that of an x-ray tube system. A novel circular apposition target arrangement and a sensitive detector have been provided which enable the system to perform on-stream analysis, and thereby provide the aircraft powerplant operator with wear information directly on the flight line. The novel system of this invention may be attached to each engine oil system, and while the engine is operating, will perform the necessary analysis.

SUMMARY OF THE INVENTION

It is, therefore, an object of this invention to provide an engine condition monitoring system using engine oil inspection by x-ray fluorescence techniques in which the concentration of metal wear particles is continuously monitored.

In accordance with a preferred embodiment of this invention in which iron is the wear metal monitored, a beta excited x-ray source such as promethium-147 is mounted in a novel circular copper apposition target arrangement to supply primary x-rays to circulating engine oil. Any iron which occurs in the oil at the sampling location will emit secondary fluorescent radiation which is measured by a lithium-drifted silicon semiconductor detector.

Another object of this invention is a novel annular apposition radioactive source and target arrangement.

In accordance with the invention, the required volume of the radioactive material is mounted on an annular metal base on which concentric circular indentations have been made. A metal target such as copper of proper thickness is placed over the radioactive material, and the entire assembly is positioned in a plastic fixture surrounded by a shielding material such as tungsten.

BRIEF DESCRIPTION OF THE DRAWINGS

FIG. 1 is a schematic drawing in partial block diagram form showing the turbine engine metal-in-oil measurement system of this invention.

FIG. 2 shows the annular apposition target arrangement of FIG. 1.

FIGS. 3–13 show details of the annular apposition target arrangement of FIG. 2.

DESCRIPTION OF THE PREFERRED EMBODIMENT

Inherent to the lubricating oil system of an aircraft gas turbine engine are wear metal particles. As long as the concentration of these particles remains within certain operating tolerances, wear is considered normal. Any marked increase above a specific threshold level is considered cause for engine examination. The monitoring of wear particle concentrations in military applications is performed routinely by subjecting small volume oil samples, extracted from the engine lubrication system, to emission or atomic absorption spectrometric analysis. In this way, normal operating tolerance levels have been empirically established for certain aircraft powerplants.

The sampling analysis described above is, however, dependent on small static oil samples which may not be representative of the entire lubrication system. In addition, sample processing delays can occur. The x-ray fluorescent techniques described in this application can dynamically (on-stream) monitor the wear metal concentrations during ground or flight operation and will offer information which may be immediately factored into aircraft flight scheduling.

This x-ray fluorescent dynamic sampling method is based on the penetration of circulating oil by primary electromagnetic radiation of about 1.5 Angstroms in wavelength. Interaction of this primary radiation with wear metal atoms in the oil results in the ejection of inner atomic electrons and the transition of outer electrons to the vacant inner levels, thereby producing secondary radiations (fluorescence) which are unique to each wear element and which have an intensity proportional to the concentration. Monitoring the intensity of the emitted secondary radiation provides the basis for the on-stream quantitative analysis of wear metal concentration.

While x-ray fluorescent techniques are useful in determining the concentrations in oil of such elements as nickel, cobalt, vanadium, and zinc, it has been found that the most useful information is obtained by a determination of the iron content in the oil. While many of the techniques and procedures disclosed will also be useful with other elements, the preferred embodiment of this application will be described in terms of the detection of iron, and is primarily concerned with determining the desired iron base-line detection level of about 5 parts per million. Potential engine malfunctioning will show a trend-type increase to the 15–20 part per million level.

A basic requirement for an on-stream radioactive oil analyzer unit as disclosed herein is the ability to indicate an increase in the iron concentration level above the base-line level (5 ppm) in a practical length of time, that is, approximately 5 minutes for a flight line unit and approximately 30 minutes for an airborne unit.

The lowest limit of detection by x-ray fluorescent analysis is governed by the extent of conversion of primary radiation into characteristic fluorescent radiation relative to the number of background events monitored by the detector. The higher the conversion of primary exciting radiation into fluorescent secondary emissions, the lower the concentration limit detectable becomes. In practice, the magnitude of conversion depends on the energy or wavelength of the exciting primary radiation, the quantity of exciting radiation incident on the sample, the geometry of the source-sample-detector, the medium in which the exciting and fluorescent radiations travel, and the resolution of the detector for the fluorescent radiations.

For the element analyzed, there is a wavelength of exciting radiation which is preferentially absorbed. In the case of iron, a wavelength of 1.75 Angstroms (7.111 kev) is most highly converted into fluorescent radiation. An exciting primary radiation of shorter wavelength (higher energy) will excite characteristic fluorescence, but with a lower conversion efficiency. There are a limited number of available radioisotope sources with emissions suitable for iron excitation, but since none of these is monoenergetic, the detector background, and hence the lower limit of iron detectibility, is increased. This problem has been overcome by selecting as the source a beta excited x-ray source utilizing promethium-147 which has a 2.6 year half-life. As will be described, the promethium-147 is contained in a novel apposition target source, which for a copper target generates primary radiation of 8.047 kev.

A schematic of the novel inspection system is shown in FIG. 1. A gas turbine engine 10 has a representative oil sample taken therefrom through line 12, the oil being fed into a chamber 14 in which a thin layer of the oil is exposed to the beta excited x-ray radiation. The oil layer is approximately one-fourth inch deep. The oil then passes from chamber 14 through a line 16 where it is returned to engine 10.

Although engine 10 has been described as an aircraft gas turbine engine, it may be any type of machine in which it is desired to determine the concentration of iron or other metal in oil.

Lines 12 and 16 through which the oil is fed may be flexible tubing, connected to a convenient location in the engine. Valving may be provided to control the flow of oil. Any suitable type of coupling may be used.

The chamber 14 must be constructed from plastic or other nonmetallic material. A plastic, preferably a polyimide such as KAPTON or VESPEL, is preferred because of the lesser radiation absorption. The chamber preferably includes input and output manifolds to regulate the pressure of the oil as it passes through the chamber. It is also preferable that the oil at the point of exposure to the beta excited x-ray radiation consist of a thin layer, and that the chamber at that point be very thin and also be transparent to the desired radiation wavelengths. As shown in the Figure, a thin plastic window 17 is provided to expose the oil to maximum radiation intensity.

The promethium-147 excited x-ray source is contained in the annular apposition target arrangement shown as reference numberal 18 which will be described in detail in connection with FIG. 2. The entire target assembly including the promethium source is positioned immediately adjacent to chamber 14 through which the oil flows so that the x-rays emitted therefrom shown at 19 impinge on the oil through plastic window 17. The x-rays shown at 21 emitted by the metal in the oil pass through the center of the annular target structure 18 and impinge on detector 20 through a beryllium window 22 inserted between the detector 20 and chamber 14. The window 22 should have low iron content.

The detector is preferably a lithium-drifted silicon semiconductor detector. The detector 20 is cooled to liquid nitrogen temperatures by standard means such as a cryostat 24. A refrigerator may also be used for cooling. A solid copper rod 25 is positioned to contact detector 20 at one end thereof, the other end of rod 25 being immersed in liquid nitrogen contained in a chamber 27. Detector 20 is also positioned inside the cryostat 24. The cryostat is preferably evacuated by means of a vacuum pump, not shown, and then sealed.

Chamber 14 and annular target arrangement 18 are supported by members 29 preferably made from a strong plastic material. Other mechanical arrangements of support may also be provided.

Detector 20 is electrically connected to a preamplifier 28 through electrical connecting line 26, and the output from the preamplifier is fed to electronic analyzer circuitry 30. The power supply for the detector is not shown. The electronic analyzer circuitry may include well-known amplifiers, pulse height analyzers, and readout apparatus as is well known to those skilled in the art.

In order to properly calibrate the electronic circuitry, a calibration source 32 preferably with an on-off shutter is positioned in the top wall of chamber 14. A source such as cobalt 57 may be used to calibrate the electronics when iron is the metal to be detected. Other radioactive calibration sources may be used when other metallic elements are to be detected.

The annular geometry apposition x-ray source 18 including the radioactive material and the target are shown in greater detail in FIGS. 2–13. The radioactive source and the target material are chosen to produce a wavelength of exciting radiation which is preferentially absorbed for the element analyzed. For iron, the preferred radioactive source is promethium-147, and the preferred target material is copper, although nickel may also be used. To detect other wear metal elements other combinations of radioactive source and target materials may be used as will be described.

The promethium-147 radioactive source is a beta excited x-ray source which produces a high intensity in the characteristic x-ray line of the target material. Promethium powder cannot be used as the beta emitter since even the finest powder would have excessive self-absorption of the beta rays and a high proportion of undesirable continuous radiation. Furthermore, in powder form the promethium is subjected to a shift in its physical position. These considerations would reduce the usable radiation obtained thus increasing the lower limit of detectibility for a practical counting time. Consequently, it is preferred that the promethium be as pure as possible and be contained as a solute in a hydrochloric or nitric acid solvent and then placed on a backing surface in sufficiently thin layers to minimize the degrading side effects. The solution is then evaporated.

Referring now to FIG. 2, the promethium solution 50 is placed in a uniform distribution of drops on an annular copper plate 52 approximately 0.005 inches thick or less. The plate 52 is shown in more detail in FIGS. 7 and 8. The copper plate is preferably of ultrahigh purity copper, and has a plurality of concentric photoetched grooves 54 approximately 0.02 inches apart as shown in FIG. 9, the grooves being approximately 0.001 inches wide and 0.0005 inches deep. The concentric grooves 54 permit high concentrations of the promethium-hydrochloric acid solution to be uniformly distributed on the face of the annular copper plate 52 by controlling the spread of the drops of solution. Other similar arrangements of grooves, indentations, etc. may also be effective.

A copper plate of 0.005 inches thickness may be considered an infinite thickness for the beta rays emitted by promethium-147, and this arrangement regains part of the source strength which would otherwise be wasted by producing copper x-rays and reflecting them back toward the oil sample.

A very thin pure copper foil target 56 approximately 0.0002 inches thick is bonded over the evaporated promethium 50 with a bonding agent being applied preferably only to the inner and outer edges of the annulus without contacting the evaporated promethium. The target is shown in detail in FIGS. 5 and 6. A thin target foil is preferred to produce a high ratio of characteristic radiation to continuous radiation.

The sandwich consisting of the copper plate 52, the evaporated promethium 50 and the copper target 56 is then positioned in a machinable tungsten dish 58 which has been lined with a plastic shield 60. The plastic shield 60 is shown in detail in FIGS. 10 and 11, while the tungsten dish is shown in FIGS. 12 and 13. Both the tungsten dish and the plastic shield have raised outer walls 62 and inner walls 64 so that the target sandwich structure will fit within and between the walls. The plastic shield 60 is also slightly smaller than the tungsten dish 58 and fits within the tungsten dish. A final layer of thin plastic 66 as shown in FIGS. 3 and 4 is bonded to the entire assembly to prevent any beta particles that pass through the target from escaping from the radioactive source. If beta particles did escape from the source, they would fluoresce the surrounding fixtures, and detrimentally increase the background level. The tungsten dish 58 acts as a shield for the x-rays which would impinge on the detector, since tungsten is a very dense element.

The copper target 56 and plastic shield 66 may be composed of a thin layer of copper deposited on the plastic material.

It is important that all the materials used in the annular apposition source and target assembly be carefully scrutinized for iron content. Any small amount of iron present will increase the background in the region of interest, thus decreasing the statistical accuracy of the technique of this invention.

The operation of this system will now be described. The evaporated promethium 50 emits beta particles (electrons) in an isotropic manner, that is, the electrons are equally distributed in all directions. The electrons strike either the copper target 56 or the copper plate 52 ejecting therefrom an inner electron. When the inner electron is removed, an outer electron collapses into this energy level emitting the energy difference as radiation characteristic of the target material (fluorescence). These fluorescent x-rays, due to the geometry of the system shown in FIG. 1, pass through plastic window 17 and are absorbed by the iron or other wear metal in the oil sample being analyzed.

The same fluorescent process that the beta rays caused initially in the target material is produced in the wear metal, namely, an inner electron is ejected and an outer electron collapses into this energy level, emitting the energy difference as secondary x-rays having an energy characteristic of the wear metal suspended in the oil sample. The intensity of these secondary x-rays is linearly proportional to the concentration of the wear metal in the oil.

The lucite liner 60 in the tungsten is necessary to prevent any of the beta particles from striking the tungsten dish 58 and fluorescing it, thereby interfering with the wear metal system. The tungsten dish 58 is necessary to keep any of the primary x-rays emitted by the target material from directly striking the detector and masking the relatively small wear metal fluorescent yield.

The promethium-147 radioactive source and the copper target arrangement are preferred for detecting the presence of iron. Nickel may replace the copper for some applications. Other metals may also be useful for detecting the presence of other metals in the oil.

While this invention has been described with respect to the preferred embodiment, it will be apparent to those skilled in the art that substitutions and modifications may be made in the construction and arrangement of the parts without departing from the scope of the invention as hereinafter claimed.

We claim:

1. Apparatus for measuring the concentration of iron in oil comprising a source of primary x-ray radiation consisting of a radioactive source of promethium-147, a metallic base for containing said promethium-147 and a thin target of the same metal as said base positioned adjacent said promethium-147, said source being arranged to form an annulus and emitting a high flux of radiation having an energy slightly above the characteristic fluorescent radiation energy of iron, a container having a wall substantially transparent to x-ray radiation at the wavelength of said primary radiation, a thin layer of oil in said container, means for directing said primary radiation toward said transparent wall to intersect said oil layer, and a detector positioned to intercept secondary fluorescent radiation emitted by the iron in said oil.

2. Apparatus for measuring the concentration of a metal element in a carrier fluid comprising a source of primary x-ray radiation including a radioactive material of promethium-147 contained on a copper base and having a thin copper target positioned adjacent said radioactive material, said radiation source being arranged in an annular configuration having a centrally located space therein and emitting a high flux of radiation having an energy slightly above the characteristic fluorescent radiation energy of the metal, a container having a wall substantially transparent to x-ray radiation at the wavelength of said primary radiation, means for continuously flowing said carrier fluid through said container so that said fluid forms a thin layer within said container, means for directing said primary radiation toward said transparent wall to intersect said thin fluid layer, and a detector positioned to intercept secondary fluorescent radiation emitted by the metal element in said carrier fluid.

3. Apparatus as in claim 2 in which the metal element is iron and is contained in a carrier fluid consisting primarily of oil.

4. Apparatus as in claim 2 in which said copper base is annular and contains a plurality of concentric grooves therein into which said radioactive material is deposited in solution.

5. Apparatus as in claim 4 in which said annular copper base, said radioactive source and said copper target are positioned in an annular tungsten dish lined with a plastic material.

6. Apparatus as in claim 2 in which said copper target is deposited on a thin layer of polyimide plastic.

7. Apparatus as in claim 2 in which said detector is exposed to the secondary radiation which passes through the space in the center of said radiation source.

8. Apparatus as in claim 7 and including a source of cobalt-57 positioned adjacent said container so that the radioactive rays emitted therefrom pass through the center of said radiation source and are sensed by said detector, and shutter means positioned between said source of cobalt-57 and said detector.

* * * * *